(12) United States Patent
Sung et al.

(10) Patent No.: US 11,884,810 B2
(45) Date of Patent: *Jan. 30, 2024

(54) THERMOPLASTIC RESIN COMPOSITION AND MOLDED ARTICLE INCLUDING THE SAME

(71) Applicant: LG CHEM, LTD., Seoul (KR)

(72) Inventors: Da Eun Sung, Daejeon (KR); Tae Hoon Kim, Daejeon (KR); Chun Ho Park, Daejeon (KR); Yong Hee An, Daejeon (KR); Wangrae Cho, Daejeon (KR); Ho Hoon Kim, Daejeon (KR); Jeongmin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 315 days.

This patent is subject to a terminal disclaimer.

(21) Appl. No.: 17/298,523

(22) PCT Filed: Aug. 25, 2020

(86) PCT No.: PCT/KR2020/011328
§ 371 (c)(1),
(2) Date: May 28, 2021

(87) PCT Pub. No.: WO2021/045429
PCT Pub. Date: Mar. 11, 2021

(65) Prior Publication Data
US 2022/0010122 A1    Jan. 13, 2022

(30) Foreign Application Priority Data

Sep. 6, 2019 (KR) .................. 10-2019-0110417
Aug. 24, 2020 (KR) .................. 10-2020-0106135

(51) Int. Cl.
| | |
|---|---|
| C08L 51/00 | (2006.01) |
| C08L 25/12 | (2006.01) |
| C08L 25/14 | (2006.01) |
| C08L 33/12 | (2006.01) |
| C08L 77/06 | (2006.01) |

(52) U.S. Cl.
CPC ............. *C08L 51/003* (2013.01); *C08L 25/12* (2013.01); *C08L 25/14* (2013.01); *C08L 33/12* (2013.01); *C08L 77/06* (2013.01); *C08L 2205/025* (2013.01); *C08L 2205/035* (2013.01); *C08L 2205/18* (2013.01); *C08L 2207/53* (2013.01)

(58) Field of Classification Search
CPC ........... C08L 2205/025; C08L 2205/03; C08L 2205/035; C08L 33/08; C08L 33/10; C08L 33/12; C08L 25/12; C08L 25/14; C08L 51/04; C08L 51/06; C08L 51/003; C08L 2207/53; C08L 77/00–06
See application file for complete search history.

(56) References Cited

U.S. PATENT DOCUMENTS

| | | | |
|---|---|---|---|
| 5,912,305 A | 6/1999 | McKee | |
| 6,696,165 B1 | 2/2004 | Bennett et al. | |
| 7,488,775 B2 | 2/2009 | Nakai et al. | |
| 2006/0094822 A1 | 5/2006 | Gaggar | |
| 2012/0172499 A1 | 7/2012 | Na | |
| 2017/0107373 A1 | 4/2017 | Matsuyama | |
| 2019/0185655 A1 | 6/2019 | Park | |
| 2019/0382574 A1* | 12/2019 | An ........................ C08L 33/062 |

FOREIGN PATENT DOCUMENTS

| | | |
|---|---|---|
| CN | 1486347 A | 3/2004 |
| CN | 1678682 A | 10/2005 |
| CN | 103958599 A | 7/2014 |
| CN | 107109022 A | 8/2017 |
| CN | 109071912 A | 12/2018 |
| EP | 1044241 B1 * | 8/2004 |
| EP | 3 438 198 A2 | 2/2019 |
| JP | S83222139 A | 12/1983 |
| JP | 1996311353 A | 11/1996 |
| JP | H10-36626 A | 2/1998 |
| JP | H1036626 A | 2/1998 |
| JP | 2003-335827 A | 11/2003 |
| JP | 2006509048 A | 3/2006 |
| JP | 2015-537090 A | 12/2015 |
| JP | 2016196656 A | 11/2016 |
| KR | 10-2005-0030643 A | 3/2005 |
| KR | 10-2006-0016165 A | 2/2006 |
| KR | 10-2009-0095764 A | 9/2009 |
| KR | 10-2015-0065132 A | 6/2015 |
| KR | 10-2015-0069888 A | 6/2015 |
| KR | 10-2015-0114239 A | 10/2015 |
| KR | 10-2017-0062984 A | 6/2017 |

(Continued)

OTHER PUBLICATIONS

Extended European Search Report for EP Application No. 20861457.8, dated Nov. 23, 2021.

(Continued)

*Primary Examiner* — Ana L. Woodward

(57) ABSTRACT

The present invention relates to a thermoplastic resin composition and a molded article including the same. More specifically, the thermoplastic resin composition of the present invention includes 100 parts by weight of a base resin consisting of 10 to 30% by weight of an acrylate-aromatic vinyl compound-vinyl cyanide compound graft copolymer (A-1) including an acrylate rubber having an average particle diameter of 0.05 to 0.15 μm, 20 to 40% by weight of an acrylate-aromatic vinyl compound-vinyl cyanide compound graft copolymer (A-2) including an acrylate rubber having an average particle diameter of 0.3 to 0.5 μm, 0 to 35% by weight of an aromatic vinyl polymer (B), and 10 to 60% by weight of a polymethacrylate (C); and 0.5 to 10 parts by weight of a polyamide (D).

17 Claims, No Drawings

(56) References Cited

FOREIGN PATENT DOCUMENTS

| KR | 10-2018-0023492 A | 3/2018 |
| KR | 10-2018-0050596 A | 5/2018 |
| KR | WO 2018/084558 A2 * | 5/2018 |
| WO | 99/33914 A2 | 7/1999 |
| WO | 2019/112183 A1 | 6/2019 |
| WO | WO2019112183 A1 | 6/2019 |

OTHER PUBLICATIONS

The Examination report for Indian Patent Application No. 202117024186, dated Apr. 18, 2023.
Office Action dated Nov. 27, 2023 for European Patent Application No. 20 861 457.8.

* cited by examiner

THERMOPLASTIC RESIN COMPOSITION AND MOLDED ARTICLE INCLUDING THE SAME

CROSS-REFERENCE TO RELATED APPLICATIONS

This application is a National Phase of International Application No. PCT/KR2020/011328 which claims priority to Korean Patent Application No. 10-2019-0110417, filed on Sep. 6, 2019, and Korean Patent Application No. 10-2020-0106135, re-filed on Aug. 24, 2020, based on the priority of the above patent, in the Korean Intellectual Property Office, the disclosures of each of which are incorporated herein by reference.

TECHNICAL FIELD

The present invention relates to a thermoplastic resin composition and a molded article including the same, and more particularly, to a low-gloss thermoplastic resin composition having mechanical properties and processability equal or superior to those of conventional ASA-based resins; having excellent weather resistance; exhibiting good aesthetics and soft feeling due to a low surface roughness value thereof; and having even surface gloss and a molded article including the low-gloss thermoplastic resin composition.

BACKGROUND ART

Acrylate compound-styrene-acrylonitrile copolymers (hereinafter referred to as "ASA resins") have good weather resistance, aging resistance, chemical resistance, rigidity, impact resistance, and processability, and are widely used in various fields such as automobiles, miscellaneous goods, and construction materials due to broad applicability thereof.

However, in the field of exterior materials, there is a growing need for development of a low-gloss ASA resin that meets aesthetic demands of consumers beyond the artificial feeling of plastic.

As an example of the low-gloss ASA resin, crystalline resins such as nylon have been developed. When the crystalline resin is used, low gloss can be achieved, but there are limitations in improving the physical properties of exterior materials such as weather resistance and surface texture.

RELATED ART DOCUMENTS

[Patent Documents] (Patent Document 1) KR 2009-0095764 A

DISCLOSURE

Technical Problem

Therefore, the present invention has been made in view of the above problems, and it is one object of the present invention to provide a low-gloss thermoplastic resin composition having mechanical properties and processability equal or superior to those of conventional ASA-based resins; having excellent weather resistance; exhibiting good aesthetics and soft feeling due to a low surface roughness value thereof; and having even surface gloss and a molded article including the low-gloss thermoplastic resin composition.

The above and other objects can be accomplished by the present disclosure described below.

Technical Solution

In accordance with one aspect of the present invention, provided is a thermoplastic resin composition including 100 parts by weight of a base resin consisting of 10 to 30% by weight of an acrylate-aromatic vinyl compound-vinyl cyanide compound graft copolymer (A-1) including an acrylate rubber having an average particle diameter of 0.05 to 0.15 µm, 20 to 40% by weight of an acrylate-aromatic vinyl compound-vinyl cyanide compound graft copolymer (A-2) including an acrylate rubber having an average particle diameter of 0.3 to 0.5 µm, 0 to 35% by weight of an aromatic vinyl polymer (B), and 10 to 60% by weight of a polymethacrylate (C); and 0.5 to 10 parts by weight of a polyamide (D) and a molded article including the thermoplastic resin composition.

Advantageous Effects

As apparent from the foregoing, the present invention advantageously provides a low-gloss thermoplastic resin composition having mechanical properties and processability equal or superior to those of conventional ASA-based resins; having excellent weather resistance; exhibiting good aesthetics and soft feeling due to a low surface roughness value thereof; and having even surface gloss and a molded article including the low-gloss thermoplastic resin composition.

BEST MODE

Hereinafter, a thermoplastic resin composition of the present invention and a molded article including the same will be described in detail.

The present inventors confirmed that, to achieve a matte effect by adding a polyamide to an ASA resin, when the morphology of the ASA resin was adjusted and a methyl methacrylate-styrene-acrylonitrile copolymer or polymethyl methacrylate was included as an essential component in a predetermined composition ratio, a low-gloss thermoplastic resin composition having mechanical properties and processability equal or superior to those of conventional ASA-based resins; having excellent weather resistance; exhibiting good aesthetics and soft feeling due to a low surface roughness value thereof; and having even surface gloss was obtained. Based on these results, the present inventors conducted further studies to complete the present invention.

The thermoplastic resin composition of the present invention includes 100 parts by weight of a base resin consisting of 10 to 30% by weight of an acrylate-aromatic vinyl compound-vinyl cyanide compound graft copolymer (A-1) including an acrylate rubber having an average particle diameter of 0.05 to 0.15 µm, 20 to 40% by weight of an acrylate-aromatic vinyl compound-vinyl cyanide compound graft copolymer (A-2) including an acrylate rubber having an average particle diameter of 0.3 to 0.5 µm, 0 to 35% by weight of an aromatic vinyl polymer (B), and 10 to 60% by weight of a polymethacrylate (C); and 0.5 to 10 parts by weight of a polyamide (D). In this case, a thermoplastic resin composition having mechanical properties and processability equal or superior to those of conventional ASA-based resins; having excellent weather resistance; having low gloss and even surface gloss; and exhibiting good aesthetics and soft feeling due to a low surface roughness value thereof may be provided.

Hereinafter, each component constituting the thermoplastic resin composition of the present invention will be described in detail.

A-1) Acrylate-Aromatic Vinyl Compound-Vinyl Cyanide Compound Graft Copolymer For example, the graft copolymer (A-1) may include an acrylate rubber having an average particle diameter of 0.05 to 0.15 μm, preferably 0.1 to 0.15 μm, more preferably 0.12 to 0.15 μm, still more preferably 0.12 to 0.14 μm or 0.13 to 0.15 μm. Within this range, a finally prepared thermoplastic resin composition may have excellent weather resistance, colorability, impact strength, chemical resistance, and surface gloss.

The acrylate rubber is preferably a core.

In this description, an average particle diameter may be measured by dynamic light scattering, specifically using Nicomp 380 (manufacturer: PSS).

In addition, in this description, an average particle diameter may mean an arithmetic average particle diameter in a particle size distribution measured by dynamic light scattering, specifically, the average particle diameter of scattering intensities.

For example, the graft copolymer (A-1) may be included in an amount of 10 to 30% by weight, preferably 15 to 25% by weight, more preferably 15 to 20% by weight. Within this range, weather resistance, fluidity, tensile strength, and impact strength may be excellent.

For example, the graft copolymer (A-1) may include 40 to 60% by weight of an acrylate rubber, 25 to 45% by weight of an aromatic vinyl compound, and 10 to 20% by weight of a vinyl cyanide compound. Within this range, weather resistance, fluidity, tensile strength, and impact strength may be excellent.

As a preferred example, the graft copolymer (A-1) may include 45 to 55% by weight of an acrylate rubber, 30 to 50% by weight of an aromatic vinyl compound, and 5 to 20% by weight of a vinyl cyanide compound. Within this range, weather resistance, fluidity, tensile strength, and impact strength may be excellent.

As a more preferred example, the graft copolymer (A-1) may include 45 to 55% by weight of an acrylate rubber, 30 to 40% by weight of an aromatic vinyl compound, and 10 to 20% by weight of a vinyl cyanide compound. Within this range, weather resistance, fluidity, tensile strength, and impact strength may be excellent.

In this description, a polymer including a certain compound means a polymer prepared by polymerizing the compound, and a unit in the polymer is derived from the compound.

For example, the graft copolymer (A-1) may be prepared through emulsion polymerization. In this case, chemical resistance, weather resistance, fluidity, tensile strength, and impact strength may be excellent.

Emulsion graft polymerization methods commonly practiced in the art to which the present invention pertains may be used as the emulsion polymerization method of the present invention without particular limitation.

For example, the acrylate may include one or more selected from the group consisting of alkyl acrylates containing an alkyl group having 2 to 8 carbon atoms. Preferably, the acrylate includes alkyl acrylates containing an alkyl group having 4 to 8 carbon atoms, more preferably butyl acrylate or ethylhexyl acrylate.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

A-2) Acrylate-Aromatic Vinyl Compound-Vinyl Cyanide Compound Graft Copolymer For example, the graft copolymer (A-2) may include an acrylate rubber having an average particle diameter of 0.3 to 0.5 μm, preferably 0.35 to 0.5 μm, more preferably 0.4 to 0.5 μm, still more preferably 0.45 to 0.50 μm. Within this range, weather resistance may be good, and fluidity and mechanical strength, such as tensile strength and impact strength, may be excellent.

The acrylate rubber is preferably a core.

For example, the graft copolymer (A-2) may be included in an amount of 20 to 40% by weight, preferably 25 to 35% by weight, more preferably 30 to 35% by weight. Within this range, weather resistance, fluidity, tensile strength, and impact strength may be excellent.

For example, the graft copolymer (A-2) may include 40 to 60% by weight of an acrylate rubber, 25 to 45% by weight of an aromatic vinyl compound, and 10 to 20% by weight of a vinyl cyanide compound. Within this range, weather resistance, fluidity, tensile strength, and impact strength may be excellent.

As a preferred example, the graft copolymer (A-2) may include 45 to 55% by weight of an acrylate rubber, 30 to 40% by weight of an aromatic vinyl compound, and 10 to 20% by weight of a vinyl cyanide compound. Within this range, weather resistance, fluidity, tensile strength, and impact strength may be excellent.

The graft copolymer (A-1) is preferably included in a lesser amount than the graft copolymer (A-2). More preferably, a weight ratio between the graft copolymer (A-1) and the graft copolymer (A-2) is 1:1.1 to 1:4, still more preferably 1:1.2 to 1:2. Within this range, weather resistance, fluidity, tensile strength, and impact strength may be excellent.

A total weight of the graft copolymer (A-1) and the graft copolymer (A-2) is preferably 40 to 60% by weight, more preferably 45 to 55% by weight, still more preferably 47 to 53% by weight based on a weight of the base resin. Within this range, weather resistance, fluidity, tensile strength, and impact strength may be excellent.

For example, the graft copolymer (A-2) may be prepared through emulsion polymerization. In this case, weather resistance, fluidity, tensile strength, and impact strength may be excellent.

Emulsion graft polymerization methods commonly practiced in the art to which the present invention pertains may be used as the emulsion polymerization method of the present invention without particular limitation.

B) Aromatic Vinyl Polymer

For example, the aromatic vinyl polymer (B) may be included in an amount of 0 to 35% by weight, preferably 10 to 35% by weight, more preferably less than 10% by weight, still more preferably less than 5% by weight. Most preferably, the aromatic vinyl polymer (B) is absent. Within this range, weather resistance may be excellent, and a surface roughness value may be significantly reduced, thereby realizing even gloss and a soft touch.

The aromatic vinyl polymer (B) preferably includes 65 to 80% by weight of an aromatic vinyl compound and 20 to 35% by weight of a vinyl cyanide compound. Within this range, chemical resistance and impact strength may be excellent.

For example, the aromatic vinyl polymer (B) may have a weight average molecular weight of 80,000 to 180,000 g/mol, preferably 80,000 to 160,000 g/mol. Within this range, tensile strength and impact strength may be excellent.

For example, the aromatic vinyl polymer (B) may be an aromatic vinyl compound-vinyl cyanide compound copolymer. As a preferred example, the aromatic vinyl polymer (B) may be a styrene-acrylonitrile copolymer (an SAN resin), an alpha-methylstyrene-acrylonitrile copolymer (a heat-resistant SAN resin), or a mixture thereof. In this case, heat resistance may be excellent.

The styrene-acrylonitrile copolymer is preferably included in an amount of 15 to 35% by weight, more preferably 15 to 25% by weight. Within this range, heat resistance may be excellent.

The styrene-acrylonitrile copolymer preferably includes 65 to 80% by weight of styrene and 20 to 35% by weight of acrylonitrile. Within this range, processability and impact strength may be excellent.

For example, the styrene-acrylonitrile copolymer may have a weight average molecular weight of 100,000 to 180,000 g/mol, preferably 100,000 to 150,000 g/mol. Within this range, heat resistance may be excellent.

The alpha-methylstyrene-acrylonitrile copolymer is preferably included in an amount of 10 to 20% by weight, more preferably 12 to 18% by weight. Within this range, heat resistance may be excellent.

The alpha-methylstyrene-acrylonitrile copolymer preferably includes 70 to 75% by weight of alpha-methylstyrene and 25 to 30% by weight of acrylonitrile, more preferably 60 to 75% by weight of alpha-methylstyrene, 0 to 10% by weight of styrene, and 20 to 30% by weight of acrylonitrile or 60 to 70% by weight of alpha-methylstyrene, 0 to 10% by weight of styrene, and 25 to 30% by weight of acrylonitrile, still more preferably 60 to 75% by weight of alpha-methylstyrene, 5 to 10% by weight of styrene, and 20 to 30% by weight of acrylonitrile or 60 to 70% by weight of alpha-methylstyrene, 5 to 10% by weight of styrene, and 25 to 30% by weight of acrylonitrile. Within this range, heat resistance may be excellent.

The alpha-methylstyrene-acrylonitrile copolymer preferably has a weight average molecular weight of 80,000 to 120,000 g/mol. Within this range, heat resistance may be excellent.

In this description, unless otherwise defined, weight average molecular weight may be measured using gel permeation chromatography (GPC, Waters Breeze). As a specific example, weight average molecular weight may be measured using tetrahydrofuran (THF) as an eluate through gel permeation chromatography (GPC, Waters Breeze). In this case, weight average molecular weight is obtained as a relative value to a standard polystyrene (PS) specimen.

For example, the aromatic vinyl polymer (B) may be prepared using suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

C) Polymethacrylate

For example, the polymethacrylate (C) may be included in an amount of 10 to 60% by weight, preferably 25 to 55% by weight, more preferably 25 to 50% by weight, still more preferably 30 to 50% by weight, still more preferably 35 to 50% by weight, most preferably 45 to 50% by weight. Within this range, a thermoplastic resin composition having mechanical properties and processability equal or superior to those of conventional ASA-based resins and having excellent weather resistance may be prepared. In addition, a surface roughness value may be greatly reduced, thereby realizing good aesthetics and soft feeling.

The polymethacrylate (C) preferably includes a methacrylate monomer in an amount of 55% by weight or more, preferably 60% by weight or more, most preferably 65% by weight or more. Within this range, weather resistance may be greatly improved, and a surface roughness value may be greatly reduced, thereby realizing good aesthetics and soft feeling.

For example, the methacrylate monomer may be an alkyl methacrylate containing an alkyl group having 1 to 15 carbon atoms. As a specific example, the methacrylate monomer may include one or more selected from the group consisting of methyl methacrylate, ethyl methacrylate, butyl methacrylate, 2-ethylbutyl methacrylate, 2-ethylhexyl methacrylate, and lauryl methacrylate, preferably an alkyl methacrylate containing an alkyl group having 1 to 4 carbon atoms, more preferably methyl methacrylate.

The polymethacrylate (C) may include one or more selected from the group consisting of polymethyl methacrylate resins and methyl methacrylate-styrene-acrylonitrile copolymers, preferably a polymethyl methacrylate resin or a methyl methacrylate-styrene-acrylonitrile copolymer, more preferably a polymethyl methacrylate resin. In this case, weather resistance may be excellent, and good aesthetics and soft feeling may be realized due to a low surface roughness value.

For example, the polymethyl methacrylate resin may have a weight average molecular weight of 35,000 to 200,000 g/mol, preferably 50,000 to 200,000 g/mol. Within this range, weather resistance, fluidity, tensile strength, and impact strength may be excellent, and good aesthetics and soft feeling may be realized due to a low surface roughness value.

As another example, the polymethyl methacrylate resin may be a mixture of a polymethyl methacrylate resin (hereinafter referred to as "high molecular weight PMMA resin") having a weight average molecular weight of 50,000 to 200,000 g/mol and a polymethyl methacrylate resin (hereinafter referred to as "low molecular weight PMMA resin") having a weight average molecular weight of 35,000 to 45,000 g/mol.

For example, the weight ratio between the high molecular weight PMMA resin and the low molecular weight PMMA resin may be 1:0.1 to 2.0, preferably 1:1.3 to 1.7, more preferably 1:1.4 to 1.6. Within this range, fluidity, tensile strength, impact strength, and weather resistance may be excellent, and good aesthetics and soft feeling may be realized due to a low surface roughness value.

In this description, the weight ratio between A and B means the weight ratio of A:B.

For example, the methyl methacrylate-styrene-acrylonitrile copolymer includes 65 to 85% by weight of methyl methacrylate, 5 to 30% by weight of styrene, and 5 to 10% by weight of acrylonitrile. Within this range, weather resistance may be excellent, and good aesthetics and soft feeling may be realized due to a low surface roughness value.

For example, the methyl methacrylate-styrene-acrylonitrile copolymer may have a weight average molecular weight of 70,000 to 140,000 g/mol. As another example, the methyl methacrylate-styrene-acrylonitrile copolymer may have a weight average molecular weight of 70,000 to 90,000 g/mol or greater than 90,000 g/mol and less than or equal to 140,000 g/mol. Within this range, weather resistance, fluidity, tensile strength, and impact strength may be excellent, and good aesthetics and soft feeling may be realized due to a low surface roughness value.

As another example, the methyl methacrylate-styrene-acrylonitrile copolymer may be a mixture of a methyl methacrylate-styrene-acrylonitrile copolymer (hereinafter referred to as "low molecular weight SAMMA resin") having a weight average molecular weight of 70,000 to 90,000 g/mol and a methyl methacrylate-styrene-acrylonitrile copolymer (hereinafter referred to as "high molecular weight SAMMA resin") having a weight average molecular weight of 120,000 to 140,000 g/mol.

For example, the weight ratio between the low molecular weight SAMMA resin and the high molecular weight SAMMA resin may be 1:0.1 to 0.45, preferably 1:0.2 to 0.45, more preferably 1:0.3 to 0.45, still more preferably 1:0.35 to 0.45. Within this range, weather resistance may be excellent.

For example, the polymethacrylate (C) may be prepared using solution polymerization, bulk polymerization, emulsion polymerization, or suspension polymerization. Solution polymerization, bulk polymerization, emulsion polymerization, and suspension polymerization commonly practiced in the art to which the present invention pertains may be used in the present invention without particular limitation.

D) Polyamide

For example, the polyamide (D) may be included in an amount of 0.5 to 10 parts by weight, preferably 1 to 8 parts by weight, more preferably 4 to 8 parts by weight, still more preferably 4 to 6 parts by weight based on 100 parts by weight of the base resin. Within this range, a matte effect may be achieved due to decrease in gloss, and physical property balance may be excellent.

The polyamide (D) refers to a thermoplastic polymer containing an amide bond. As a specific example, the polyamide (D) may include one or more selected from the group consisting of polyamide 6, polyamide 66 (PA 6.6), polyamide 46, polyamide LL, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I, preferably polyamide 66 (PA 6.6).

For example, the polyamide (D) having a melting point of 230° C. or more, preferably 240° C. or more, more preferably 250° C. or more, still more preferably 260 to 270° C. may be used.

For example, the polyamide (D) having a relative viscosity (96% sulfuric acid solution) of 2.0 to 4.0, preferably 2.0 to 3.5, more preferably 2.0 to 3.0, still more preferably 2.4 to 2.7 may be used.

In this description, relative viscosity may be measured using an Ubbelohde viscometer according to ISO 307.

Polymerization methods commonly practiced in the art to which the present invention pertains may be used as a method of preparing the polyamide (D) without particular limitation, and commercially available polyamides may also be used when the commercially available polyamides follow the definition of the polyamide according to the invention.

Thermoplastic Resin Composition

For example, the thermoplastic resin composition of the present invention may have an average roughness value of 4 or less, preferably 3.5 or less, more preferably 3 or less, still more preferably 2.5 or less for 5 points as measured using an optical profiler system.

For example, the thermoplastic resin composition may have a weather resistance (ΔE) value of 4.0 or less, preferably 3.5 or less, more preferably 3.2 or less, still more preferably 3.0 or less as measured for 2,000 hours according to SAE J1960.

For example, the thermoplastic resin composition may have a melt flow index (MI) (temperature: 220° C., load: 10 kg) of 3 g/10 min or more, preferably 7 g/10 min or more, more preferably 10 g/10 min or more, still more preferably 12 g/10 min or more, as a specific example, 12 to 15 g/10 min, as measured according to ASTM D1238.

For example, the thermoplastic resin composition may have a tensile strength (⅛ inch) of 290 kg/cm$^2$ or more, preferably 380 kg/cm$^2$ or more, more preferably 400 kg/cm$^2$ or more, still more preferably 470 kg/cm$^2$ or more, as a specific example, 380 to 490 kg/cm$^2$, as measured according to ASTM 638.

For example, the thermoplastic resin composition may have an Izod impact strength (¼ inch) of 7 kg·cm/cm or more, preferably 9 kg·cm/cm or more, as a specific example, 7 to 11 kg·cm/cm or 8 to 11 kg·cm/cm, as measured according to ASTM 256.

For example, the thermoplastic resin composition may have a film gloss of 14 or less, 11 or less, or 10.5 or less, preferably 9.5 or less, more preferably 9.3 or less, as a specific example, 4.8 to 14.0 or 4.8 to 11.0, as measured at 60° using a gloss meter (product name: VG7000). Within this range, matte properties and physical property balance may be excellent. Accordingly, the thermoplastic resin composition of the present invention may also be referred to as a matte thermoplastic resin composition.

When necessary, the thermoplastic resin composition may optionally further include one or more selected from the group consisting of a heat stabilizer, a light stabilizer, a dye, a pigment, a colorant, a release agent, an antistatic agent, an antibacterial agent, a processing aid, a metal deactivator, a flame retardant, a smoke suppressant, an anti-dripping agent, an anti-friction agent, and an anti-wear agent in an amount of 0.01 to 5 parts by weight, 0.05 to 3 parts by weight, 0.1 to 2 parts by weight, or 0.5 to 1 part by weight. Within this range, required physical properties may be implemented without deteriorating the natural properties of the thermoplastic resin composition of the present invention.

For example, a method of preparing the thermoplastic resin composition of the present invention includes a step of mixing 100 parts by weight of a base resin consisting of 10 to 30% by weight of an acrylate-aromatic vinyl compound-vinyl cyanide compound graft copolymer (A-1) including an acrylate rubber having an average particle diameter of 0.05 to 0.15 μm, 20 to 40% by weight of an acrylate-aromatic vinyl compound-vinyl cyanide compound graft copolymer (A-2) including an acrylate rubber having an average particle diameter of 0.3 to 0.5 μm, 0 to 35% by weight of an aromatic vinyl polymer (B), and 10 to 60% by weight of a polymethacrylate (C); and 0.5 to 10 parts by weight of a polyamide (D) and a step of preparing a pellet at 220 to 280° C. using an extrusion kneader. In this case, a thermoplastic resin composition having mechanical properties and processability equal or superior to those of conventional ASA-based resins; having excellent weather resistance; having low gloss and even surface gloss; and exhibiting good aesthetics and soft feeling due to a low surface roughness value thereof may be provided.

The method of preparing the thermoplastic resin composition shares all the technical characteristics of the thermoplastic resin composition described above, and thus repeated description thereof will be omitted.

The step of preparing a pellet using an extrusion kneader is preferably performed at 220 to 280° C., more preferably 240 to 280° C. In this case, the temperature is the temperature of a cylinder.

Extrusion kneaders commonly used in the art to which the present invention pertains may be used without particular limitation, and a twin-screw extrusion kneader is preferably used.

Molded Article

A molded article of the present invention includes the thermoplastic resin composition of the present invention. In this case, the molded article of the present invention may have mechanical properties and processability equal or superior to those of conventional molded articles, may have excellent weather resistance and low gloss, may exhibit even surface gloss, and may exhibit good aesthetics and soft feeling due to a low surface roughness value thereof.

For example, the molded article may be an extrusion-molded article or an injection-molded article, preferably a building exterior material, more preferably a siding door or window, or a sliding door or window.

Preferably, the molded article is prepared by extruding or injecting the thermoplastic resin composition of the present invention at a molding temperature of 190 to 250° C. Within this range, an excellent matte effect may be achieved.

In describing the thermoplastic resin composition of the present invention, the method of preparing the same, and the molded article including the same, other conditions or equipment that are not explicitly described may be appropriately selected without particular limitation within the range commonly practiced in the art.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 10 and Comparative Examples 1 to 3 are as follows.

A-1) A first graft copolymer (50% by weight of a butylacrylate polymer having an average particle diameter of 100 nm, shell: 36% by weight of styrene, 14% by weight of acrylonitrile) according to emulsion polymerization A-2) A second graft copolymer (50% by weight of a butylacrylate polymer having an average particle diameter of 400 nm, shell: 38% by weight of styrene, 12% by weight of acrylonitrile) according to emulsion polymerization B-1) An SAN resin (92RF) according to bulk polymerization B-2) A heat-resistant SAN resin (200UH) according to bulk polymerization C-1) An SAMMA resin (XT500) according to bulk polymerization C-2) An SAMMA resin (XT510) according to bulk polymerization C-3) A PMMA resin (IH830)

C-4) A PMMA resin (BA611)

D) PA 6.6

Examples 1 to 10 and Comparative Examples 1 to 3

As shown in Table 1 below, the components were prepared according to the contents and kneaded and extruded at 280° C. using a twin-screw extruder to prepare a pellet. In addition, a sheet of 0.15 T was prepared at a molding temperature of 220° C. using the prepared pellet. Then, film gloss and surface roughness values were measured. In addition, the prepared pellet was injected at a molding temperature of 220° C. to prepare a specimen for measuring physical properties. Then, the tensile strength and impact strength of the specimen were measured.

Test Examples

The physical properties of the pellets, sheets, and specimens prepared in Examples 1 to 10 and Comparative Examples 1 to 3 were measured according to the following methods, and the results are shown in Table 1 below.

Melt index (MI): The melt index of the prepared pellet was measured under a condition of 220° C./10 kg according to ASTM D1238.

Tensile strength (kg/cm$^2$): Tensile strength was measured according to ASTM 638.

Izod impact strength (kg.cm/cm): Izod impact strength was measured according to ASTM 256.

Film gloss: Film gloss was measured at 60° using a gloss meter (product name: VG7000).

Surface roughness value: Surface roughness values were measured for 5 points using an optical profiler system (NV-2700, Nano System Co., Ltd.) using an objective lens (x10) and an eyepiece (x1) (F.O.V: 628 μm×471 μm) in a mode of WSI Envelope and a scan range of ±30 μm, and an average value thereof was calculated. As a surface roughness value decreases, a soft touch and gloss increase.

Weather resistance: Weather resistance was measured for 2,000 hours according to SAE J1960, and a weather resistance (ΔE) value was obtained by Equation 1 below. As the weather resistance (ΔE) value decreases, weather resistance increases.

$$\Delta E = \sqrt{(\Delta a)^2 + (\Delta b)^2 + (\Delta L)^2} \quad \text{[Equation 1]}$$

TABLE 1

| Parts by weight | Examples | | | | | | | | | | Comparative Examples | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| A-1 | 20 | 20 | 20 | 20 | 20 | 20 | 10 | 25 | 30 | 20 | 20 | 20 | 20 |
| A-2 | 30 | 30 | 30 | 30 | 30 | 30 | 40 | 25 | 20 | 30 | 30 | 30 | 30 |
| B-1 | — | — | — | 25 | — | 15 | | | | | 50 | — | — |
| B-2 | — | — | — | — | 15 | — | | | | | — | 50 | — |
| C-1 | — | 35 | 35 | — | 35 | 35 | | | | 35 | — | — | — |
| C-2 | — | 15 | — | — | — | — | | | | 15 | — | — | — |
| C-3 | 20 | — | 15 | 25 | — | — | 20 | 20 | 20 | — | — | — | 20 |
| C-4 | 30 | — | — | — | — | — | 30 | 30 | 30 | — | — | — | 30 |
| D | 5 | 5 | 5 | 5 | 5 | 5 | 5 | 5 | 5 | 3 | 5 | 5 | — |
| TiO$_2$ pigment | 0.5 | 0.5 | 0.5 | 0.5 | 0.5 | 0.5 | 0.5 | 0.5 | 0.5 | 0.5 | 0.5 | 0.5 | 0.5 |
| Melt flow index | 16.2 | 12.7 | 10.3 | 3.1 | 7.3 | 14.3 | 14.6 | 17 | 17.8 | 14.7 | 6.3 | 2.9 | 20.1 |
| Tensile strength | 388 | 470 | 474 | 405 | 490 | 298 | 370 | 397 | 406 | 478 | 384 | 420 | 389 |
| Impact strength | 8.7 | 8.01 | 8.4 | 10.88 | 11.0 | 7.4 | 9.2 | 8.5 | 8.1 | 11.6 | 12.9 | 12.4 | 16 |
| Gloss | 10.3 | 7.0 | 6.0 | 4.8 | 7.4 | 7.1 | 9.3 | 10.5 | 11.0 | 13.5 | 4.9 | 5.6 | 67 |
| Surface roughness | 2.1 | 2.34 | 3.0 | 3.5 | 3.4 | 3.1 | 2.2 | 2.0 | 2.0 | 1.93 | 4.54 | 5.3 | 0.04 |
| ΔE | 1.6 | 2 | 1.6 | 2.6 | 2.9 | 3.1 | 1.8 | 1.5 | 1.3 | 1.9 | 4.3 | 4.1 | 0.6 |

As shown in Table 1, it can be confirmed that thermoplastic resin compositions (Examples 1 to 10) according to the present invention have mechanical properties, such as melt flow index, tensile strength, and impact strength, equal or superior to those of the thermoplastic resin compositions of Comparative Examples 1 and 2 not including a polymethacrylate resin; have excellent weather resistance; exhibit good aesthetics and soft feeling due to low surface roughness values thereof; and have even surface gloss and low surface gloss. In particular, as shown in Table 1, Examples 1 to 3 and Examples 7 to 9 including a polymethacrylate resin in an amount of 40 to 60% by weight, more specifically 45 to 55% by weight, exhibit a surface roughness value of 3.0 or less, specifically 2.0 to 3.0, and a weather resistance (ΔE) value of 3.1 or less, specifically 1.3 to 3.3. Based on these results, it can be seen that the resins of Examples 1 to 3 and Examples 7 to 9 have high quality and excellent aesthetics compared to Comparative Examples 1 and 2.

In addition, Comparative Example 3 not including a polyamide exhibits a gloss of 67, which is 6 to 14 times higher than that of Examples 1 to 9. This result indicates that Comparative Example 3 does not satisfy the object of the present invention for preparing an aesthetically pleasing resin having matte properties and high quality.

The invention claimed is:

1. A thermoplastic resin composition, comprising:
   100 parts by weight of a base resin consisting of:
   10 to 30% by weight of an acrylate-aromatic vinyl compound-vinyl cyanide compound graft copolymer comprising an acrylate rubber having an average particle diameter of 0.05 to 0.15 μm,
   20 to 40% by weight of an acrylate-aromatic vinyl compound-vinyl cyanide compound graft copolymer (A-2), comprising an acrylate rubber having an average particle diameter of 0.3 to 0.5 μm,
   1 0 to 35% by weight of an aromatic vinyl polymer (B) that is different from graft copolymer (A-1) and graft copolymer (A-2), and
   10 to 60% by weight of an aliphatic polymethacrylate (C); and
   0.5 to 10 parts by weight of a polyamide (D).

2. The thermoplastic resin composition according to claim 1, wherein the thermoplastic resin composition has a film gloss of 14 or less as measured at 60° using a gloss meter (product name: VG7000).

3. The thermoplastic resin composition according to claim 1, wherein the thermoplastic resin composition has an average surface roughness value of 4 or less for 5 points as measured using an optical profiler system.

4. The thermoplastic resin composition according to claim 1, wherein the thermoplastic resin composition has a weather resistance (ΔE) value of 4.0 or less as measured according to SAE J1960.

5. The thermoplastic resin composition according to claim 1, wherein the graft copolymer (A-1) comprises 40 to 60% by weight of an acrylate rubber, 25 to 45% by weight of an aromatic vinyl compound, and 10 to 20% by weight of a vinyl cyanide compound.

6. The thermoplastic resin composition according to claim 1, wherein the graft copolymer (A-2) comprises 40 to 60% by weight of an acrylate rubber, 25 to 45% by weight of an aromatic vinyl compound, and 10 to 20% by weight of a vinyl cyanide compound.

7. The thermoplastic resin composition according to claim 1, wherein the graft copolymer (A-1) is comprised in a lesser amount than the graft copolymer (A-2).

8. The thermoplastic resin composition according to claim 1, wherein a total weight of the graft copolymer (A-1) and the graft copolymer (A-2) is 40 to 60% by weight based on a weight of the base resin.

9. The thermoplastic resin composition according to claim 1, wherein the aromatic vinyl polymer (B) is comprised in an amount of 10 to 35% by weight.

10. The thermoplastic resin composition according to claim 1, wherein the aromatic vinyl polymer (B) is comprised in an amount of less than 10% by weight or is absent.

11. The thermoplastic resin composition according to claim 1, wherein the aromatic vinyl polymer (B) is an aromatic vinyl compound-vinyl cyanide compound copolymer.

12. The thermoplastic resin composition according to claim 1, wherein the polymethacrylate resin (C) comprises a methacrylate monomer in an amount of 55% by weight or more.

13. The thermoplastic resin composition according to claim 12, wherein the polymethacrylate resin (C) comprises one or more selected from the group consisting of methyl methacrylate, ethyl methacrylate, butyl methacrylate, 2-ethylbutyl methacrylate, 2-ethylhexyl methacrylate, and lauryl methacrylate.

14. The thermoplastic resin composition according to claim 1, wherein the polyamide (D) is Polyamide 6.6.

15. A molded article, comprising the thermoplastic resin composition of claim 1.

16. The thermoplastic resin composition according to claim 1, wherein the polymethacrylate (C) is a mixture of a first polymethacrylate resin having a weight average molecular weight of 50,000 to 200,000 g/mol and a second polymethacrylate resin having a weight average molecular weight of 35,000 to 45,000 g/mol.

17. The thermoplastic resin composition according to claim 1, wherein the ratio of the first polymethacrylate resin to the second polymethacrylate resin is 1:0.1 to 2.0.

* * * * *